US012574931B2

(12) United States Patent
Fang

(10) Patent No.: US 12,574,931 B2
(45) Date of Patent: Mar. 10, 2026

(54) INFORMATION TRANSMISSION METHOD AND APPARATUS, TERMINAL AND NETWORK DEVICE

(71) Applicant: DATANG MOBILE COMMUNICATIONS EQUIPMENT CO., LTD., Beijing (CN)

(72) Inventor: Liang Fang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 321 days.

(21) Appl. No.: 18/566,156

(22) PCT Filed: May 27, 2022

(86) PCT No.: PCT/CN2022/095612
§ 371 (c)(1),
(2) Date: Dec. 1, 2023

(87) PCT Pub. No.: WO2022/253135
PCT Pub. Date: Dec. 8, 2022

(65) Prior Publication Data
US 2024/0292420 A1 Aug. 29, 2024

(30) Foreign Application Priority Data

Jun. 3, 2021 (CN) .......................... 202110619664.6

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0626* (2013.01); *H04L 27/2082* (2013.01); *H04W 56/0045* (2013.01); *H04W 72/11* (2023.01)

(58) Field of Classification Search
CPC . H04W 72/21; H04W 56/0045; H04W 72/11; H04B 7/0626; H04B 7/18513; H04L 27/2082; H04L 5/0053
(Continued)

(56) References Cited

U.S. PATENT DOCUMENTS 10,523,390 B2 * 12/2019 Dinan ................... H04W 52/06
10,880,058 B2 * 12/2020 Akkarakaran ........ H04L 5/0051
(Continued)

FOREIGN PATENT DOCUMENTS

CN 104348570 A 2/2015
CN 113382440 A 9/2021
(Continued)

OTHER PUBLICATIONS

International Search Report and Written Opinion issued Aug. 5, 2022 in International Application No. PCT/CN2022/095612.
(Continued)

*Primary Examiner* — Mahendra R Patel
(74) *Attorney, Agent, or Firm* — Harness, Dickey & Pierce, P.L.C.

(57) ABSTRACT

Provided are an information transmission method and apparatus, a terminal and a network device. The information transmission method comprises: transmitting, to a network device, uplink control information (UCI) carrying timing advance (TA) information.

13 Claims, 8 Drawing Sheets

(51) Int. Cl.

| | |
|---|---|
| H04L 27/20 | (2006.01) |
| H04W 56/00 | (2009.01) |
| H04W 72/11 | (2023.01) |

(58) Field of Classification Search
USPC ......................................................... 370/329
See application file for complete search history.

(56)     References Cited

U.S. PATENT DOCUMENTS

| | | | | |
|---|---|---|---|---|
| 11,528,676 | B2 * | 12/2022 | Medles ............... | H04W 56/005 |
| 11,737,042 | B2 * | 8/2023 | Huang .................. | H04W 24/10 |
| | | | | 370/350 |
| 2016/0165631 | A1 * | 6/2016 | Gao ...................... | H04L 5/0087 |
| | | | | 370/336 |
| 2018/0007681 | A1 * | 1/2018 | Yang .................... | H04W 72/56 |
| 2020/0045722 | A1 * | 2/2020 | Bae ...................... | H04W 72/21 |
| 2020/0053657 | A1 * | 2/2020 | MolavianJazi ..... | H04W 52/346 |
| 2020/0092685 | A1 * | 3/2020 | Fehrenbach .......... | H04W 72/23 |
| 2020/0396760 | A1 * | 12/2020 | Yi ......................... | H04W 72/23 |
| 2021/0306994 | A1 * | 9/2021 | Venugopal ............ | H04W 72/23 |
| 2021/0314953 | A1 * | 10/2021 | Park ...................... | H04W 80/02 |
| 2022/0086780 | A1 | 3/2022 | Tsai et al. | |
| 2023/0122786 | A1 * | 4/2023 | Bang ................... | H04W 72/232 |
| | | | | 370/329 |

FOREIGN PATENT DOCUMENTS

| | | | | | |
|---|---|---|---|---|---|
| CN | 113382440 | B | * | 9/2024 | ........ H04W 56/0065 |
| KR | 101757383 | B1 | * | 7/2017 | .......... H04W 72/569 |
| WO | WO-2015010602 | A1 | * | 1/2015 | ........... H04W 72/21 |
| WO | 2019/231305 | A1 | | 12/2019 | |
| WO | WO-2021162510 | A1 | * | 8/2021 | .......... H04L 5/0053 |
| WO | WO-2021207567 | A1 | * | 10/2021 | .......... H04L 5/0094 |
| WO | 2022/052917 | A1 | | 3/2022 | |

OTHER PUBLICATIONS

Asia Pacific Telecom et al., "Triggering of UE-specific TA report," 3GPP TSG-RAN WG2 Meeting #113 bis, R2-2103261, Apr. 12, 2021.

Oppo, "Discussion on RACH in NTN," 3GPP TSG-RAN WG2 Meeting #114 , R2-2104812, May 19, 2021.

Extended European Search Report issued Sep. 26, 2024 in European Application No. 22815181.7.

Media Tek Inc., " Timing relationship enhancements for NR-NTN," 3GPP TSG RAN WG1 Meeting #102e, R1-2005495, Aug. 24, 2020.

* cited by examiner

Different propagation distances without timing advance result in a difference between reception times of UE signals at gNB

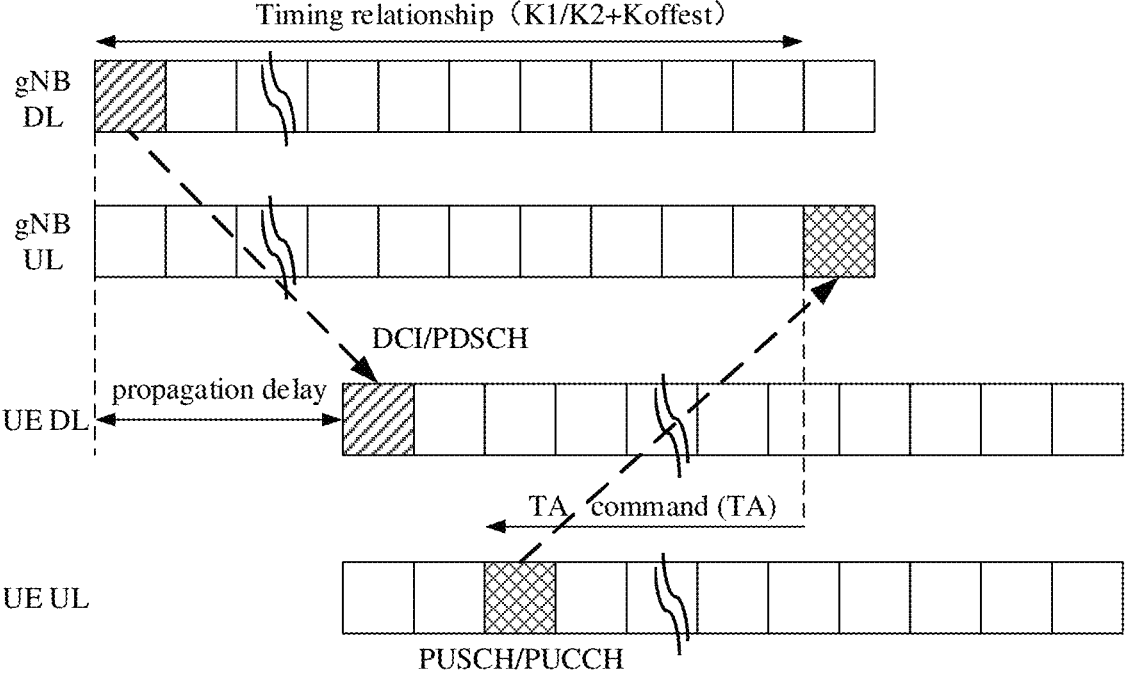
FIG. 6
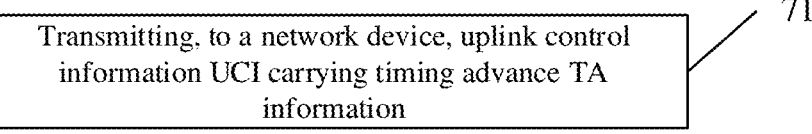
Transmitting, to a network device, uplink control information UCI carrying timing advance TA information
71
FIG. 7
Receiving, from a terminal, uplink control information UCI carrying timing advance TA information
81
FIG. 8

INFORMATION TRANSMISSION METHOD AND APPARATUS, TERMINAL AND NETWORK DEVICE

CROSS-REFERENCE TO RELATED APPLICATIONS

This application is a U.S. national phase application of a PCT Application No. PCT/CN2022/095612 filed on May 27, 2022, which claims priority to Chinese Patent Application No. 202110619664.6 filed in China on Jun. 3, 2021, the disclosures of which is are incorporated by reference herein in their entireties.

TECHNICAL FIELD

The present disclosure relates to the field of communications technology, in particular to an information transmission method and apparatus, a terminal and a network device.

BACKGROUND

In $5^{th}$ generation mobile communication technology (5G) release 17 non-terrestrial networks (NTN), user equipment (UE) calculates a UE specific uplink timing advance (TA) based on a global navigation satellite system (GNSS) and an ephemeris. In order to enable a base station to better control UE uplink transmission and resource scheduling (including calculating a scheduling slot offset (K_offset)), UE needs to report the TA to the base station.

Conventionally, there are several alternative methods for the UE to update an uplink TA to the base station, as follows:

Method 1: mapping the TA or a TA range to a preamble transmitting occasion (RACH occasion, RO). The UE transmits a preamble at a selected RO, and the base station can obtain the TA at a media access control (MAC) layer.

Method 2: by means of a radio resource control (RRC) message. The UE populates the uplink TA to a defined higher-layer RRC message, and transmits the RRC message to the base station through a physical uplink shared channel (PUSCH). After parsing out the TA, a higher layer of the base station notifies the MAC layer of the base station of it, so that the MAC layer can further calculate K_offset or a TA command.

Method 3: by means of MAC CE (control element). A new MAC CE is defined for the UE to report the TA, and is carried by a PUSCH and transmitted to the base station. The base station can obtain the TA at the MAC layer.

However, the above methods for TA reporting by the UE have following defects.

Method 1: the implementation needs to be based on RA access (random access), and random access resources need to be occupied. Additionally, due to frequent updates of UE specific TA, frequent triggering of random access may drain the power of the UE.

Method 2: the TA needs to be transmitted to the base station through PUSCH at the higher-layer, i.e., the RRC layer, and cannot be delivered to the MAC layer until the TA has been parsed out by the higher-layer of the base station. This method has a lower efficiency than directly parsing out the TA at the MAC layer. In addition, since the transmission needs to be performed through PUSCH, if there is no uplink buffer currently, a scheduling request (SR) needs to be transmitted to the base station first, which occupies additional uplink resources, and the additional step also consumes the power of the UE.

Method 3: due to the use of the newly defined MAC CE, the base station can obtain the TA through the MAC CE and perform further processing at the MAC layer. However, since the MAC CE needs to be transmitted to the base station by being carried in the PUSCH, similar to the method 2, an uplink buffer is also required for the transmission. If there is no uplink buffer, it is necessary to send an SR to the base station first and then transmit the MAC CE to the base station through the PUSCH, which will occupy additional uplink resources, and the additional step consumes the power of the UE.

From the foregoing, the conventional information transmission solutions for TA suffer from a problem of high power consumption, among others.

SUMMARY

The present disclosure is to provide an information transmission method and apparatus, a terminal and a network device, so as to solve the problem of high power consumption in conventional information transmission solutions for TA.

In order to solve the above technical problem, an embodiment of the present disclosure provides an information transmission method performed by a terminal. The method includes: transmitting, to a network device, uplink control information (UCI) carrying timing advance (TA) information.

Optionally, the TA information is contained in channel state information (CSI) of the UCI.

Optionally, the transmitting, to the network device, the UCI carrying the TA information includes:

transmitting to the network device by using a physical uplink control channel (PUCCH), periodic CSI or semi-persistent CSI carrying the TA information; or, transmitting to the network device by using a physical uplink shared channel (PUSCH), aperiodic CSI carrying the TA information.

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the transmitting, to the network device, the UCI carrying the TA information includes:

transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information: or, transmitting, to the network device, the UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold.

Optionally, the method further includes: not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

Optionally, the transmitting, to the network device, the UCI carrying the TA information includes: transmitting, to the network device, the TA information in a first PUCCH format; where the first PUCCH format includes: PUCCH format 2, PUCCH format 3, or PUCCH format 4; the TA information is modulated using quadrature phase shift keying (QPSK) or $\pi$/2-binary phase shift keying (BPSK); and/ or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides an information transmission method performed by a network device. The method includes: receiving, from a terminal, uplink control information (UCI) carrying timing advance (TA) information.

Optionally, the TA information is contained in channel state information (CSI) of the UCI.

Optionally, the receiving, from the terminal, the UCI carrying the TA information includes:

receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the receiving, from the terminal, the UCI carrying the TA information includes:

receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or, receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold.

Optionally, the method further includes: in case that TA information belonging to periodic transmission information is not received at a current transmission moment of the TA information, determining that TA information for the current transmission moment is the same as TA information received at a most recent transmission moment.

Optionally, the receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or $\pi$/2-binary phase shift keying (BPSK); and/ or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides a terminal, which includes: a memory, a transceiver and a processor. The memory is configured to store a computer program; the transceiver is configured to transmit and receive data under control of the processor; and the processor is configured to read the computer program in the memory to perform the following operation: transmitting, by the transceiver to a network device, uplink control information (UCI) carrying timing advance (TA) information.

Optionally, the TA information is contained in channel state information (CSI) of the UCI.

Optionally, the transmitting, to the network device, the UCI carrying the TA information includes:

transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the transmitting, to the network device, the UCI carrying the TA information includes:

transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or, transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold.

Optionally, the operation further includes: not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

Optionally, the transmitting, to the network device, the UCI carrying the TA information includes: transmitting, to the network device, the TA information in a first PUCCH format; where the first PUCCH format includes: PUCCH format 2, PUCCH format 3, or PUCCH format 4; the TA information is modulated using quadrature phase shift keying (QPSK) or π/2-binary phase shift keying (BPSK); and/ or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides a network device, which includes a memory, a transceiver and a processor. The memory is configured to store a computer program; the transceiver is configured to transmit and receive data under control of the processor; and the processor is configured to read the computer program in the memory to perform the following operation: receiving, by the transceiver from a terminal, uplink control information (UCI) carrying timing advance (TA) information.

Optionally, the TA information is contained in channel state information (CSI) of the UCI.

Optionally, the receiving, from the terminal, the UCI carrying the TA information includes:

receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the receiving, from the terminal, the UCI carrying the TA information includes:

receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or, receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold.

Optionally, the operation further includes: in case that TA information belonging to periodic transmission information is not received at a current transmission moment of the TA information, determining that TA information for the current transmission moment is the same as TA information received at a most recent transmission moment.

Optionally, the receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or π/2-binary phase shift keying (BPSK); and/ or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides an information transmission apparatus for a terminal. The apparatus includes: a first transmitting unit, configured to transmit, to a network device, uplink control information (UCI) carrying timing advance (TA) information.

Optionally, the TA information is contained in channel state information (CSI) of the UCI.

Optionally, the transmitting, to the network device, the UCI carrying the TA information includes:

transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the transmitting, to the network device, the UCI carrying the TA information includes:

transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or, transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold.

Optionally, the apparatus further includes: a first processing unit configured to not transmit, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

Optionally, the transmitting, to the network device, the UCI carrying the TA information includes: transmitting, to the network device, the TA information in a first PUCCH format; where the first PUCCH format includes: PUCCH format 2, PUCCH format 3, or PUCCH format 4; the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides an information transmission apparatus for a network device. The apparatus includes: a first receiving unit, configured to receive, from a terminal, uplink control information (UCI) carrying timing advance (TA) information.

Optionally, the TA information is contained in channel state information (CSI) of the UCI.

Optionally, the receiving, from the terminal, the UCI carrying the TA information includes:

receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

Optionally, the TA information includes: TA type information, a TA group identity and a TA index value; where the TA type information is used for indicating that a TA is a relative TA or an absolute TA.

Optionally, a transmission priority of the TA information is lower than a transmission priority of beam management information and a transmission priority of RI, and is higher than a transmission priority of CSI information other than the beam management information and the RI.

Optionally, the receiving, from the terminal, the UCI carrying the TA information includes:

receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or,
   receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold.

Optionally, the apparatus further includes: a first determination unit configured to, in case that TA information belonging to periodic transmission information is not received at a current transmission moment of the TA information, determine that TA information for the current transmission moment is the same as TA information received at a most recent transmission moment.

Optionally, the receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

An embodiment of the present disclosure further provides a processor readable storage medium. The processor readable storage medium stores a computer program, and the computer program is configured to be executed by a processor to perform the aforementioned information transmission method performed at the terminal side; or, the computer program is configured to be executed by the processor to perform the aforementioned information transmission method performed at the network device side.

The above technical solution of the present disclosure has beneficial effects as follows.

In the above solution of the information transmission method, since uplink control information (UCI) carrying timing advance (TA) information is transmitted to the network device, it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

BRIEF DESCRIPTION OF THE DRAWINGS

FIG. 6 is a schematic diagram showing a concept of K_offset according to an embodiment of the present disclosure:

FIG. 7 is a schematic flowchart of an information transmission method according to an embodiment of the present disclosure:

FIG. 8 is another schematic flowchart of an information transmission method according to an embodiment of the present disclosure:

DETAILED DESCRIPTION

In the following, technical solutions in embodiments of the present disclosure will be described in a clear and thorough manner with reference to the drawings in the embodiments of the present disclosure. Apparently, the described embodiments are merely a part of, rather than all of, the embodiments of the present disclosure. Based on the embodiments of the present disclosure, a person skilled in the art may, without creative effort, obtain other embodiments, all of which shall fall within the scope of the present disclosure.

The term "and/or" in the embodiments of the present disclosure describes the association relationship of associated objects and indicates that there may be three types of relationships. For example, A and/or B may represent three situations including: A alone, both A and B, and B alone. The character "/" generally indicates that the associated objects are in an "or" relationship.

The term "multiple" used in the embodiments of the present disclosure refers to two or more, and other quantifiers are similar thereto.

It is noted that the technical solution according to embodiments of the present disclosure may be applied to various systems, particularly to a 5G system. For example, an applicable system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, and a 5G New Radio (NR) system. Each of the various systems includes a terminal and a network device. The systems may further include a core network portion, such as an evolved packet system (EPS), or a 5G system (5GS).

Figure 1:
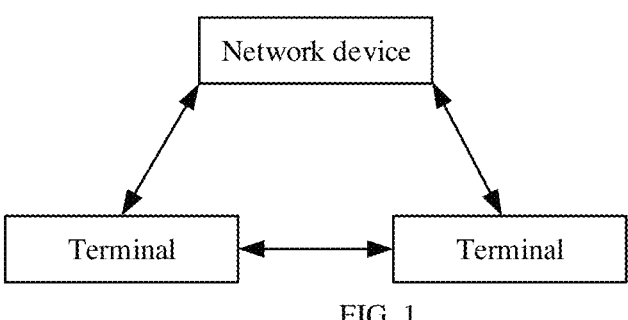
FIG. 1 is a schematic diagram of an architecture of a wireless communication system according to an embodiment of the present disclosure.

FIG. 1 shows a block diagram of a wireless communication system to which embodiments of the present disclosure are applicable. The wireless communication system includes terminals and a network device.

The terminal involved in the embodiments of the present disclosure may be a device that provides voice and/or data connectivity to a user, a handheld device with a radio connection function, or other processing devices connected to a radio modem or the like. In different systems, the names of terminal may be different. For example, in a 5G system, a terminal may be referred to as user equipment (UE). A wireless terminal can communicate with one or more core networks (CNs) via a radio access network (RAN), and the wireless terminal may be a mobile terminal, such as a mobile phone (or referred to as "cellular" phone) and a computer with a mobile terminal, such as a portable, pocket-sized, hand-held, computer built-in or vehicle-mounted mobile apparatus, which exchange voice and/or data with the radio access network. For example, personal communication service (PCS) phones, cordless phones, session initiated protocol (SIP) phones, wireless local loop (WLL) stations, personal digital assistant (PDA) and other devices. The wireless terminal may also be referred to as a system, subscriber unit, subscriber station, mobile station, mobile, remote station, access point, remote terminal, access terminal, user terminal, user agent and user device, which are not limited in the embodiments of the present disclosure.

The network device involved in the embodiments of the present disclosure may be a base station. The base station may include multiple cells that provide services to terminals. Depending on the specific application scenario, the base station may be called access point, or may be a device in the access network that communicates over an air interface with wireless terminal devices through one or more sectors, or may be called another name. The network device may be used for converting the received radio frames into Internet protocol (IP) packets or vice versa, and serves as a router between the wireless terminals and the rest of the access network. The rest of the access network may include an IP communication network. The network device may also coordinate the attribute management of the air interface. For example, the network device involved in the embodiments of the present disclosure may be a base transceiver station (BTS) in the global system for mobile communications (GSM) or code division multiple access (CDMA), a NodeB in the wide-band code division multiple access (WCDMA), an evolved Node B (eNB or e-NodeB) in long term evolution (LTE) system, a 5G base station (gNB) in 5G network architecture (next generation system), a home evolved Node B (HeNB), a relay node, a femto, a pico, or the like, which is not limited herein. In some network architectures, the network device may include a centralized unit (CU) node and a distributed unit (DU) node, which may be geographically separated.

The network device and the terminal may each perform multi-input multi-output (MIMO) transmission with each other by using one or more antennas. The MIMO transmission may be single user MIMO (SU-MIMO) or multiple user MIMO (MU-MIMO). According to the configuration and quantity of antenna combinations, the MIMO transmission may be 2 dimensional-MIMO (2D-MIMO), 3 dimensional-MIMO (3D-MIMO), full dimensional-MIMO (FD-MIMO) or massive-MIMO (massive-MIMO), and may be diversity transmission, pre-coded transmission, beam forming transmission, or the like.

The contents involved in the solution provided by the embodiments of the present disclosure will be first introduced hereinafter.

Figure 2:
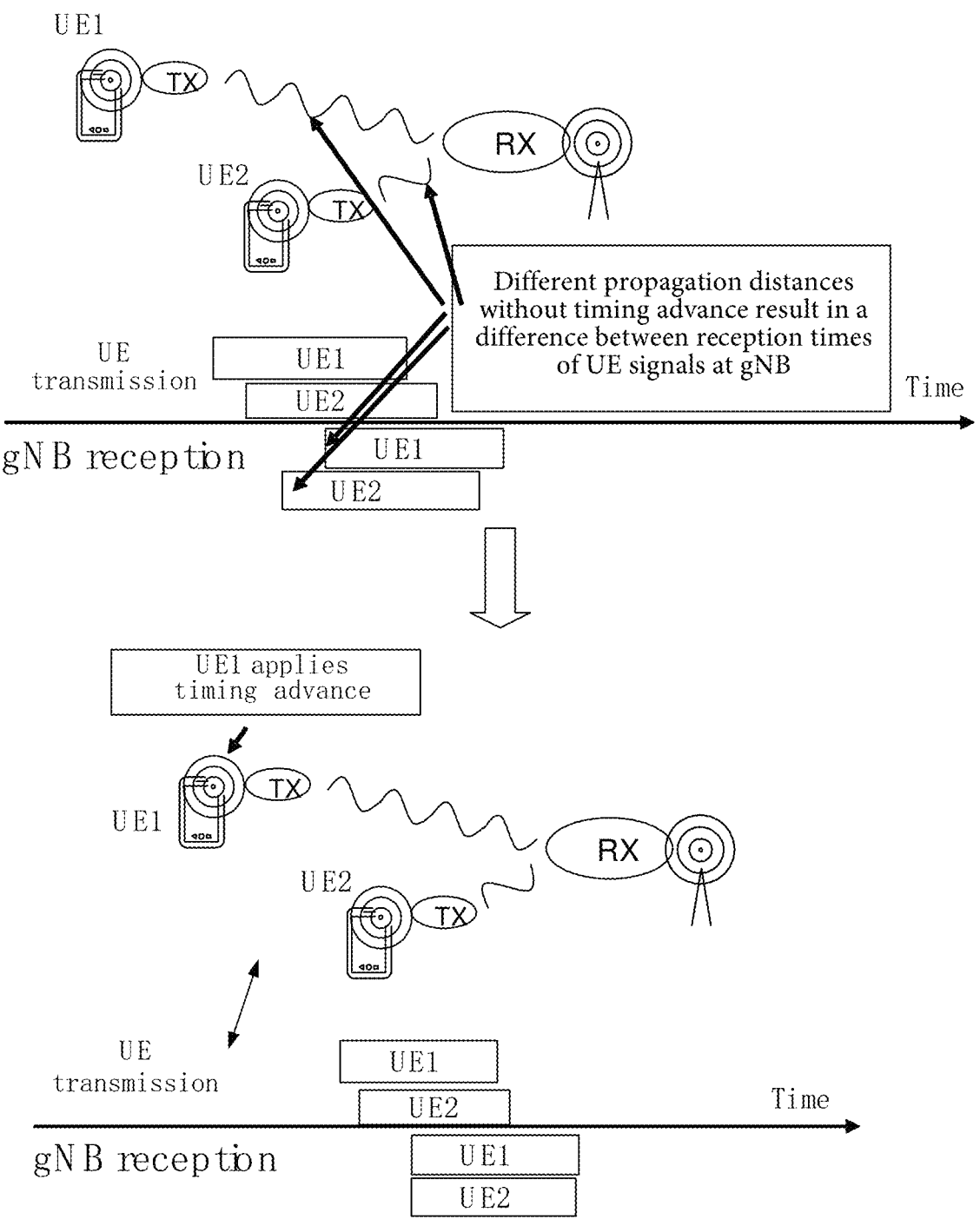
FIG. 2 is a schematic diagram of an uplink alignment procedure of terminals according to an embodiment of the present disclosure.

In a terrestrial network system, uplink synchronization is achieved based on timing advance. A base station transmits a TA command media access control (MAC) control element (CE) to a UE, so as to ensure that uplink transmissions from different UEs can reach the base station simultaneously. The base station calculates a TA command by measuring a physical uplink shared channel (PUSCH) or a channel detection reference signal, namely sounding reference signal (SRS), transmitted by a UE, and then transmits the TA command to the UE through the TA command MAC CE; the UE adjusts its uplink transmission time based on the received TA. Specifically, reference is made to a process of uplink alignment or uplink time synchronization of UEs as shown in FIG. 2 (the uplink alignment or uplink time synchronization is achieved based on timing advance). If multiple UEs perform transmissions to a gNB at the same time, the gNB may not be able to receive signals from the UEs simultaneously, due to different distances from the UEs to the gNB and thus different propagation delays. In order to maintain timing alignment at the gNB, the UE applies to uplink transmission a timing advance relative to a received downlink signal. In the case where the timing advance is not applied by the terminal, both terminal 1 and terminal 2 perform transmissions to the base station at the same time, but the base station first detects the signal of terminal 2, because terminal 2 is closer to the base station: in the case where the timing advance is applied by the terminal, terminal 1 applies the timing advance, and will transmit a signal to the base station earlier than terminal 2, so that the base station can simultaneously detect signals of terminal 1 and terminal 2.

In addition, in a 5G Release 17 non-terrestrial network system, a satellite position relative to a UE is changing, i.e., the UE position and satellite ephemeris may change, and if the uplink alignment or uplink time synchronization is performed only based on measuring a uplink signal and transmitting a TA Command MAC CE performed by the base station, frequent transmissions of MAC CE will increase the downlink overhead. As such, the UE may calculate a UE-specific uplink timing advance (TA) based on GNSS and ephemeris, and autonomously update an uplink transmission time. In the NTN (non-terrestrial networks), a propagation delay from the network to UE position changes very quickly, e.g., the maximum delay variation may be up to +/−40 μs/sec for a low earth orbit (LEO) satellite at an altitude of 600 km. Specifically, a change of a UE position relative to a base station position is denoted by time. Since a radio propagation speed is constant, the time can represent the change in a relative position of the UE, and this change is mainly caused by the movement of the satellite, μs/sec represents the number of microseconds during which the change exists in one second. Here, a magnitude of the change in the relative position of the UE may be obtained by multiplying 40 microseconds by the radio propagation speed.

Since the UE may autonomously calculate a UE-specific uplink timing advance (TA), gNB must obtain update of an uplink timing advance from the UE, namely, when and by what magnitude the UE autonomously adjusts the uplink transmission time (i.e., a duration of the uplink timing advance calibrated by the UE, for example, if uplink data is transmitted by the UE 10 microseconds in advance, the magnitude refers to 10 microseconds). Otherwise, the TA command transmitted by the gNB based on uplink signal measurement may no longer be applicable. In this case, UE needs to update TA to the base station side periodically, or based on a set threshold.

In addition, due to a long transmission delay of the non-terrestrial networks, K_offset is introduced in Release 17 on the basis of K1 and K2, so as to further enhance delay scheduling. Considering different transmission delays at the center and the edge of a cell, K_offset may be updated based on UE after initial access, which is referred to as UE-specific K_offset. The base station may derive K_offset through the TA, which requires a UE to report the UE-specific uplink timing advance, so that the base station can derive a reasonable UE-specific K_offset. K1 and K2 are slot offset parameters introduced by 5G, where K1 is an offset from a time when a UE receives a PDCCH (physical downlink control channel) to a time when the UE sends an acknowledgement (ACK), and K2 is an offset from the time when the UE receives the PDCCH to a time when the UE sends uplink data. The parameters are mainly used for more flexible scheduling of uplink and downlink data.

Based on the forgoing, (in NTN (non-terrestrial networks), the propagation delay from the network to UE position changes very quickly, e.g., the maximum delay variation may be +/−40 μs/sec for the LEO at 600 km), a periodicity of TA reporting may be calculated as follows:

1. assuming that subcarrier spacing (SCS) is 30 KHz;
2. a maximum update time of relative TA is 32×16×64× $T_c/2^\mu$, where μ represents a subcarrier spacing, μ=0 represents a subcarrier spacing of 15 kHz, μ=1 represents a subcarrier spacing of 30 kHz, and so on;
3. $T_c$ is 0.2543 nanoseconds;
4. then a maximum TA update time is 32×16×64×0.2543/2=4 microseconds;
5. in order to meet the delay variation of +/−40 μs/sec, UE performs 80/4=20 TA updates within one second; and
6. thus a TA update periodicity is 50 ms.

From the above calculation, it may be known that the TA update periodicity is close to a channel quality indicator (CQI) update periodicity of 40 ms or less than a CQI update periodicity of 80 ms. Therefore, TA reporting relying solely on PUSCH according to the method 2 or 3 is no longer the optimal solution.

Figure 3:
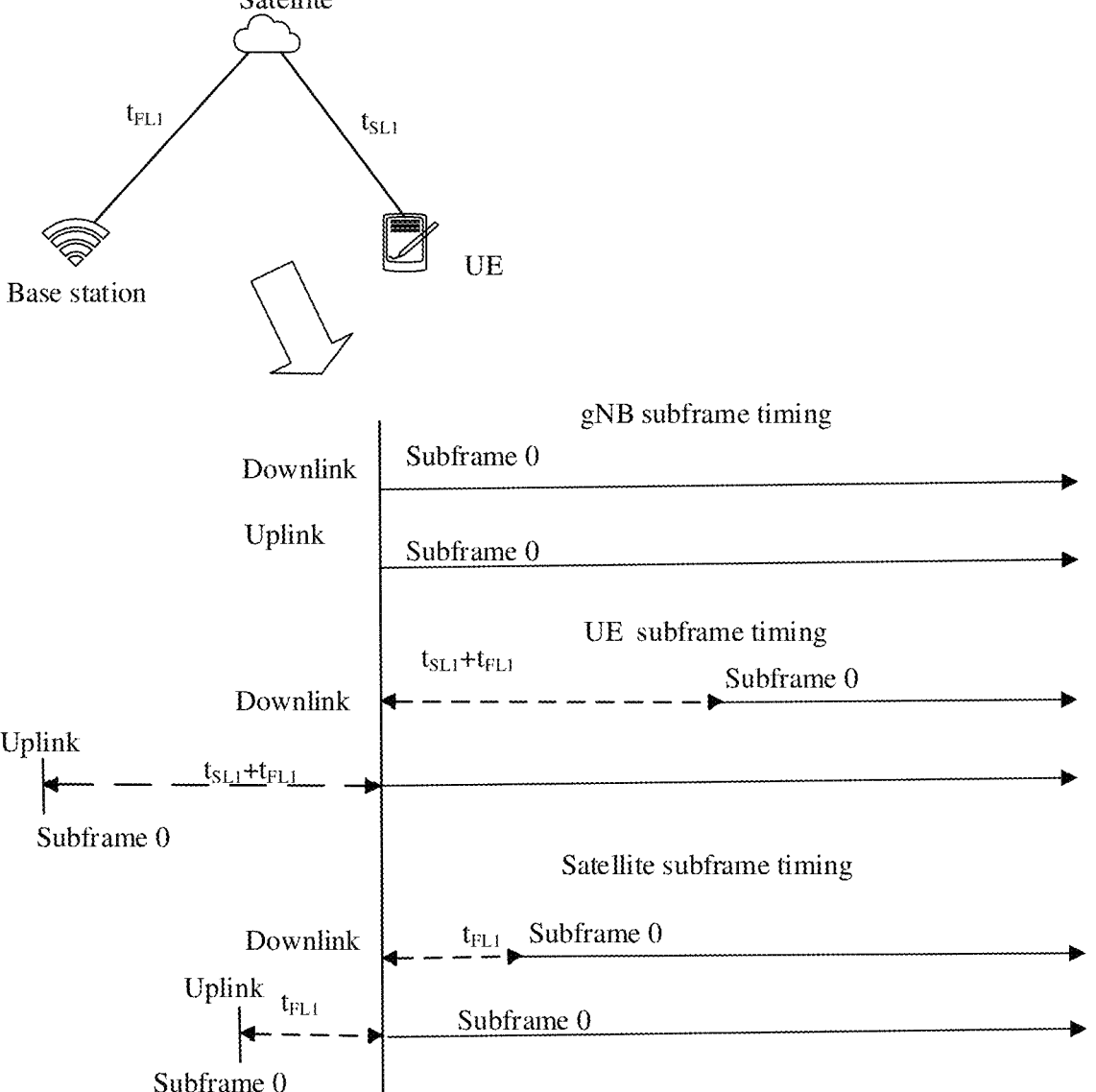
FIG. 3 is a schematic diagram of uplink timing alignment with the time reference point being a gNB according to an embodiment of the present disclosure.

For uplink alignment or uplink time synchronization when the time reference point is the gNB (base station), reference may be made to FIG. 3. As shown in FIG. 3, $t_{FL1}$ is a delay between the base station and the satellite, $t_{SL1}$ is a delay between a UE and the satellite, and subframe 0 is a starting subframe of a system time. It can be seen from FIG. 3 that downlink data is transmitted by the base station at subframe 0, reaches the satellite after $t_{FL1}$, and then reaches the UE after $t_{SL1}$. The UE detects and analyzes the downlink data based on a downlink synchronization signal. In an uplink direction, UE needs to transmit uplink data $t_{FL1}+t_{SL1}$ ahead of schedule to ensure that the base station receives the uplink data at subframe 0. The uplink timing alignment mechanism when the time reference point is the base station is the same as an uplink timing alignment mechanism at the terrestrial network.

Figure 4:
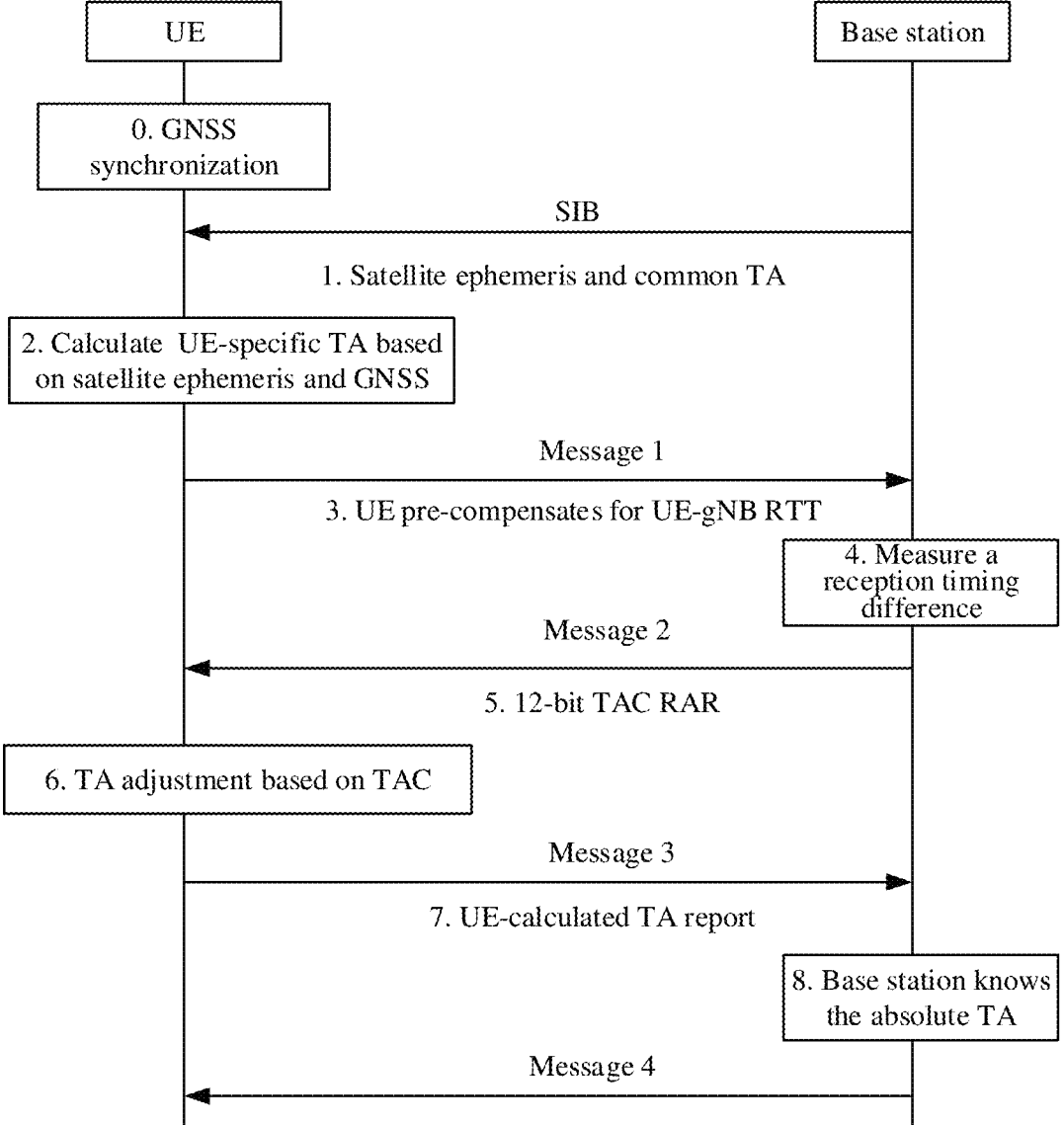
FIG. 4 is a schematic diagram of initial TA in a non-connected state according to an embodiment of the present disclosure.
Figure 5:
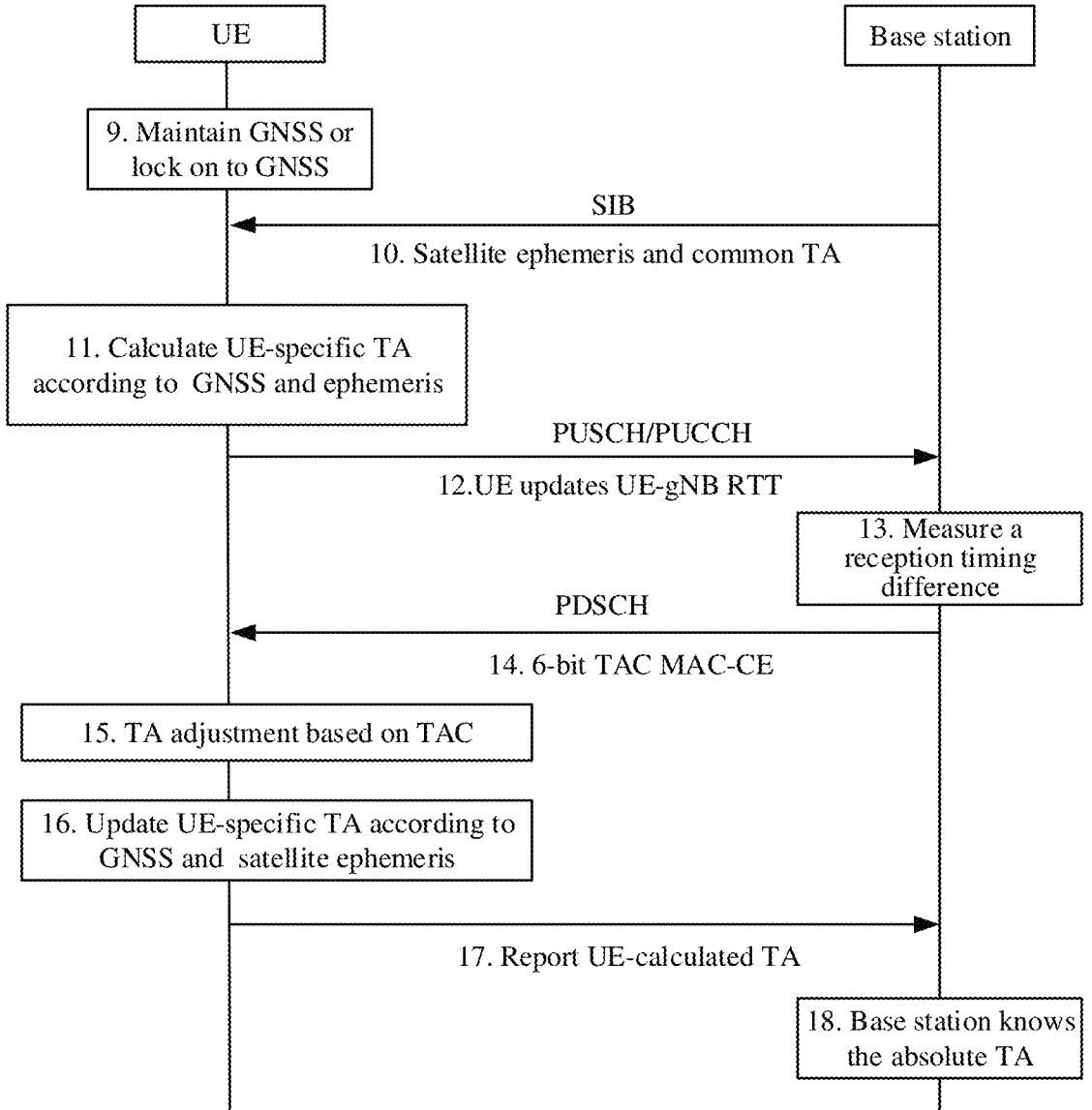
FIG. 5 is a schematic diagram of TA maintenance in a connected state according to an embodiment of the present disclosure.

Reference may be made to FIG. 4 and FIG. 5 (a schematic diagram of initial TA in a non-connected state and a schematic diagram of TA maintenance in a connected state), which schematically illustrate the initial TA in the non-connected state and the TA maintenance in the connected state, respectively, in a non-terrestrial networks (NTN) when the reference point is the base station, and are specifically as follows.

(1) The initial TA in an RRC idle state (RRC_IDLE) and/or an RRC inactive state (RRC_INACTIVE) of the RRC is as shown in FIG. 4.

In step 0, a UE ensures GNSS is ready.

In step 1, a base station broadcasts satellite ephemeris and common TA via a broadcast message. Specifically, the broadcasting may be performed through a system information block (SIB).

In step 2, the UE calculates UE-satellite round trip time (RTT) based on the satellite ephemeris and the GNSS, and takes it as a UE-specific TA.

Specifically, the UE calculates the UE-satellite RTT as the UE-specific TA based on the satellite ephemeris and a UE position obtained from the GNSS.

In step 3, the UE applies a timing advance (corresponding to the aforementioned timing advance) for sending a message 1. Specifically, the UE pre-compensates for UE-gNB RTT.

In step 4, the base station measures a reception timing difference.

Specifically, the base station measures a timing difference between the time when the message is received and a configured random access occasion.

In step 5, the base station transmits a message 2 carrying a 12-bit timing advance command (TAC) measured based on the reception of the message 1.

Specifically, the 12-bit timing advance command in random access response (TAC RAR) is sent to the terminal. RAR refers to random access response.

In step 6, the UE adjusts the timing advance based on the received 12-bit TAC, that is, TA adjustment.

In step 7, UE applies the adjusted timing advance to transmit a message 3. Meanwhile, if the message 3 has sufficient payload space, the UE reports the UE-calculated TA; otherwise, UE reports UE-calculated TA in a message 5 or another UL grant after the message 3.

Specifically, the UE transmits a UE-calculated TA report through the message 3.

In step 8, after receiving the TA report, the base station knows the absolute TA, and transmits a message 4 to the UE.

Specifically, the base station calculates K_offset based on the absolute TA, so as to schedule the transmission of the message 4.

(2) TA maintenance in an RRC connected state (RRC-_Connected) is as shown in FIG. 5.

In step 9, a UE maintains or locks on to GNSS.

Specifically, the UE maintains the GNSS by tracking or locking on to the GNSS.

In step 10, the base station broadcasts satellite ephemeris and Common TA via a broadcast message. Specifically, broadcasting may be performed through a system information block (SIB).

In step 11, the UE calculates a UE-satellite round trip time (RTT) based on satellite ephemeris and the GNSS, and takes it as a UE-specific TA.

Specifically, the UE updates the TA based on a UE position obtained from the received GNSS, the satellite ephemeris and the Common TA.

In step 12, the UE updates the UE-gNB RTT through PUSCH and/or PUCCH.

Specifically, the UE applies the updated TA for an uplink transmission.

In step 13, the base station measures a timing difference of uplink transmissions.

That is, the base station measures the timing difference of reception.

In step 14, the base station transmits a PDSCH carrying an MAC-CE of 6-bit TAC based on the measurement.

In step 15, the UE adjusts TA based on the received 6-bit TAC, namely, TA adjustment.

In step 16, UE updates the timing advance.

Specifically, UE updates UE-specific TA based on the satellite ephemeris and the GNSS.

In step 17, UE reports UE-calculated TA.

Specifically, UE applies the updated TA and reports the UE-calculated TA via PUSCH.

In step 18, the base station knows the absolute TA after receiving the TA report.

From FIG. 4 and FIG. 5, it can be seen that reporting or updating TA by a UE to a base station is performed through a PUSCH.

For the concept of K_offset in non-terrestrial networks (NTN), reference may be made to FIG. 6. It can be seen from FIG. 6 that the non-terrestrial networks have a longer propagation delay than a terrestrial network. K_offset may be introduced on the basis of K1 and K2 already present in NR to compensate for the propagation delay of the non-terrestrial networks. In this way, a duration from a time when a base station sends a PDCCH to a time when the base station receives a hybrid automatic repeat request acknowledgement (HARQ-ACK) feedback from a UE is K1+K_offset. A duration from a time when the base station transmits UL Grant to a time when the base station receives a PUSCH from the UE is K2+K_offset.

It is noted that the uplink timing advance or the timing advance refers to an amount of timing advance used for uplink alignment (or uplink time synchronization).

In view of the forgoing, embodiments of the present disclosure provide an information transmission method and apparatus, a terminal and a network device, to solve a problem of a high power consumption in conventional TA information transmission solutions. The method, the apparatus, the terminal and the network device are based on the same inventive concept. Since the method, the apparatus, the terminal and the network device have similar principles for solving the problem, for the implementation of one of the method, the apparatus, the terminal and the network device, reference may be made to the other of the method, the apparatus, the terminal and the network device. A repeated description is omitted herein.

An information transmission method provided by an embodiment of the present disclosure is performed by a terminal, as shown in FIG. 7, which includes: step 71, transmitting, to a network device, uplink control information (UCI) carrying timing advance (TA) information.

The TA information is TA information corresponding to the terminal.

Based on the information transmission method provided by the embodiment of the present disclosure, since uplink control information (UCI) carrying timing advance (TA) information is transmitted to the network device, it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

In an embodiment of the present disclosure, the TA information is contained in channel state information (CSI) of the UCI.

This allows for the reuse of relevant CSI reporting mechanisms, thereby maximizing the reuse of relevant protocols.

The transmitting, to the network device, the UCI carrying the TA information includes: transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

In this way, multiplexing on relevant PUCCH and PUSCH resources may be achieved, avoiding scheduling of an additional PUSCH air interface resource.

The transmitting the TA information by using the PUCCH may be done when there is no uplink buffer (UL Buffer); the transmitting the TA information by using the PUSCH may be done when there is an UL buffer, which is not limited herein.

In an embodiment of the present disclosure, the TA information includes: TA type information, a TA group identity and a TA index value; and the TA type information is used for indicating that a TA is a relative TA or an absolute TA.

This enables more accurate transmission of the TA information.

A transmission priority of the TA information is lower than a transmission priority of beam management information and a transmission priority of RI, and is higher than a transmission priority of CSI information other than the beam management information and the RI.

In this way, when there is a conflict between information transmissions, the transmissions may be scheduled according to their priorities, so as to normally complete the various information transmissions.

In an embodiment of the present disclosure, the transmitting, to the network device, the UCI carrying the TA information includes: transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information (belonging to periodic transmission information or semi-persistent transmission information may specifically refer to being carried in periodic CSI or semi-persistent CSI); or, transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information (belonging to aperiodic transmission information may specifically refer to being carried in aperiodic CSI), and a difference value between the first TA information and the second TA information is greater than or equal to a threshold.

This can ensure the normal transmission of the TA information.

Further, the information transmission method further includes: not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

In this way, air interface resources can be further saved, and power consumption is reduced.

In an embodiment of the present disclosure, the transmitting, to the network device, the UCI carrying the TA information includes: transmitting, to the network device, the TA information in a first PUCCH format. The first PUCCH format includes: PUCCH format 2. PUCCH format 3, or PUCCH format 4; the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity;

the TA information is encoded using a polar code in case that the payload of the TA information is greater than the first bit quantity.

The PUCCH formats 2, 3 and 4 are explained as follows. A physical uplink control channel (PUCCH) is used for carrying hybrid automatic repeat request acknowledgement (HARQ-ACK), and uplink control information (UCI) such as scheduling request (SR) and channel state information (CSI). In NR, also known as 5G, five kinds of PUCCH formats have been defined based on transmission requirements. The PUCCH formats 0 and 1 are used for carrying HARQ-ACK, while format 2, 3, or 4 is used for carrying UCI, including all types of uplink control information. PUCCH format 2 is a short format that occupies 1 to 2 symbols in the time domain. PUCCH format 3 is a long format that occupies 4 to 14 symbols in the time domain. Neither of the PUCCH formats 2 and 3 supports multiplexing of multiple UEs. The PUCCH format 4, like the PUCCH format 3, is a long format that only occupies one physical resource block (PRB) in the frequency domain and supports multiplexing of multiple UEs. Since the PUCCH formats 0 and 1 are only used for HARQ-ACK, the PUCCH format 2, 3, or 4 is used here to carry TA reports.

By using π/2-BPSK, the peak to average power ratio (PAPR) can be further reduced, and the transmission performance can be improved.

An embodiment of the present disclosure further provides an information transmission method performed by a network device. As shown in FIG. 8, the method includes: step 81, receiving, from a terminal, uplink control information (UCI) carrying timing advance (TA) information.

The TA information is TA information corresponding to the terminal.

Based on the information transmission method provided by the embodiment of the present disclosure, since uplink control information (UCI) carrying timing advance (TA) information and transmitted by the terminal is received, it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

In an embodiment of the present disclosure, the TA information is contained in channel state information (CSI) of the UCI.

This allows for the reuse of relevant CSI reporting mechanisms, thereby maximizing the reuse of relevant protocols.

The receiving, from the terminal, the UCI carrying the TA information includes: receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

In this way, multiplexing on relevant PUCCH and PUSCH resources may be achieved, avoiding scheduling of additional PUSCH air interface resource.

The receiving the TA information transmitted by using the PUCCH may be done when there is no uplink buffer (UL Buffer); the receiving the TA information transmitted by using the PUSCH may be done when there is an UL buffer, which is not limited herein.

In an embodiment of the present disclosure, the TA information includes: TA type information, a TA group identity and a TA index value; and the TA type information is used for indicating that a TA is a relative TA or an absolute TA.

This enables more accurate transmission of TA information.

A transmission priority of the TA information is lower than a transmission priority of beam management information and a transmission priority of RI, and is higher than a transmission priority of CSI information other than the beam management information and the RI.

In this way, when there is a conflict between information transmissions, the transmissions may be scheduled according to their priorities, so as to normally complete the various information transmissions.

In an embodiment of the present disclosure, the receiving, from the terminal, the UCI carrying the TA information includes: receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information (belonging to periodic transmission information or semi-persistent transmission information may specifically refer to being carried in periodic CSI or semi-persistent CSI); or, receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information (belonging to aperiodic transmission information may specifically refer to being carried in aperiodic CSI), and a difference value between the first TA information and the second TA information is greater than or equal to a threshold.

This can ensure the normal transmission of the TA information.

Further, the information transmission method includes: in case that TA information belonging to periodic transmission information is not received at a current transmission moment of the TA information, determining that TA information for the current transmission moment is the same as TA information received at a most recent transmission moment. This can be understood as: if no data is detected by the network device during receiving periodic TA, the network device considers that the TA remains unchanged.

In this way, air interface resources can be further saved, and power consumption is reduced.

"the current transmission moment of the TA information belonging to periodic transmission information" may be understood as: the current moment is the transmission moment of periodic TA information: correspondingly, "the TA information belonging to periodic transmission information is not received at the current transmission moment of the TA information" may be understood as the case that the current moment is the transmission moment of periodic TA information and the TA information is not received.

In an embodiment of the present disclosure, the receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

The PUCCH formats 2, 3 and 4 are explained as follows. A physical uplink control channel (PUCCH) is used for carrying hybrid automatic repeat request acknowledgement (HARQ-ACK), and uplink control information (UCI) such as scheduling request (SR) and channel state information (CSI). In NR, also known as 5G, five kinds of PUCCH formats have been defined based on transmission requirements. The PUCCH formats 0 and 1 are used for carrying HARQ-ACK, while format 2, 3, or 4 is used for carrying UCI, including all types of uplink control information. PUCCH format 2 is a short format that occupies 1 to 2 symbols in the time domain. PUCCH format 3 is a long format that occupies 4 to 14 symbols in the time domain. Neither of the PUCCH formats 2 and 3 supports multiplexing of multiple UEs. The PUCCH format 4, like the PUCCH format 3, is a long format that only occupies one physical resource block (PRB) in the frequency domain and supports multiplexing of multiple UEs. Since the PUCCH formats 0 and 1 are only used for HARQ-ACK, the PUCCH format 2, 3, or 4 is used here to carry TA reports.

By using π/2-BPSK, the peak to average power ratio (PAPR) can be further reduced, and the transmission performance can be improved.

In an embodiment of the present disclosure, the specific occasion of using timing advance may be a timing alignment process, which is not limited herein.

An example of the information transmission method provided in the embodiment of the present disclosure is explained below.

In view of the above technical problem, an embodiment of the present disclosure provides an information transmission method, which may be implemented as a method for reporting timing advance (TA) by a UE based on UCI (uplink control information). The following contents are involved.

In the present disclosure, a TA updated by the UE to the base station may be used as follows:

1. the base station calculates a TA Command based on the updated TA and measurement of an uplink signal;

2. the base station derives UE-specific K_offset based on the updated TA, to perform uplink and downlink scheduling.

Based on this, the TA updated by the UE may be considered as a new type of uplink control information (UCI). The present disclosure supports the UE TA reporting by defining a new channel state information (CSI) report quantity. In this way, TA may be periodically or semi-persistently reported by the UE to the base station based on CSI through PUCCH, or may be non-periodically reported based on CSI through PUSCH. This reuses the CSI reporting mechanism. TA may be multiplexed and reported together with relevant CSI report quantity, or may be separately configured with reporting resources for reporting separately. When there is a UL buffer, TA may be reported to the base station based on aperiodic CSI via PUSCH. When there is no UL buffer, TA may be reported to the base station based on periodic or semi-persistent CSI via PUCCH. This avoids occupying additional PUSCH and RA resources and fully utilizes relevant CSI resources. A minor modification is made on relevant protocols, where only a new CSI report quantity (i.e., adding TA into CSI) and TA payload format need to be added, and protocols can be reused in other aspect. This solution specifically involves the following.

1. CSI Report Quantity

TA may be added into report quantity (Report Quantity) of reporting configuration (CSI-ReportConfig). For a CSI report quantity comprising only a TA, it is not necessary to configure relevant measurement resource settings (this is the difference from CSI reporting: when a CSI is reported as UCI, CSI-RS reference signal configured by a base station needs to be measured, and the CSI is reported based on a measurement result: for a TA, there is no need to configure a dedicated measurement reference signal for a UE, the UE may obtain the TA by measuring a downlink signal and then adjust the TA spontaneously).

Specifically, a new report quantity may be added into uplink state information reporting configuration to support the reporting of uplink control information of uplink timing advance. The added report quantity may be as follows:

uplink state information reference signal resource indicator-rank indicator-precoding matrix indicator-channel quality indicator-uplink timing advance (cri-RI-PMI-CQI-TA);

uplink state information reference signal resource indicator-rank indicator-first level codebook-uplink timing advance (cri-RI-il-TA);

uplink state information reference signal resource indicator-rank indicator-layer indicator-precoding matrix indicator-channel quality indicator-uplink timing advance (cri-RI-LI-PMI-CQI-TA);

uplink timing advance (TA).

2. A Format of TA Reported by a UE Includes Two Situations: Supporting Long Format TA and not Supporting Long Format TA.

Figures 9, 10, 11, 12:
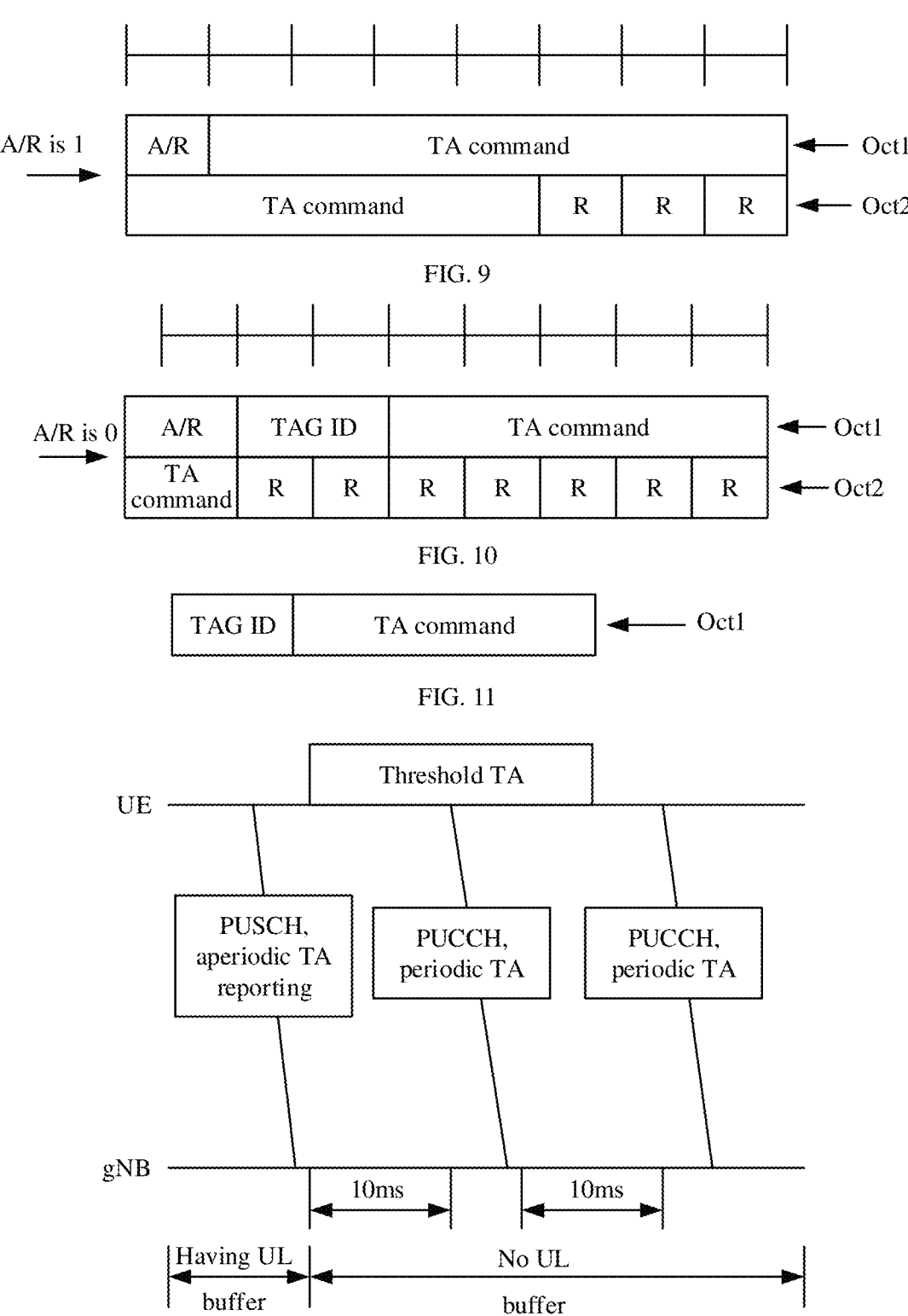
FIG. 9 is a schematic diagram of a TA format which is parsed into a long format according to an embodiment of the present disclosure.
FIG. 10 is another schematic diagram of a TA format which is parsed into a short format according to an embodiment of the present disclosure.
FIG. 11 is a schematic diagram of a short format according to an embodiment of the present disclosure.
FIG. 12 is a schematic flowchart of a specific implementation process of an information transmission method according to an embodiment of the present disclosure.

A. During an initial access procedure, a UE needs to report a full TA to a base station, and in this case, the long format TA needs to be supported. In an RRC connected state, the UE may update a relative TA to the base station. A/R (i.e., TA type indicator, which corresponds to the above TA type information) is used for indicating that a reported TA is an absolute TA or a relative TA. For example, when A/R is 1, it is an absolute TA; and when A/R is 0, it is a relative TA. The TA group (TAG) identity (ID) is ID of a TAG. TA Command is an index value of $T_A$ (i.e., TA). The relative TA may be 6 bits, and the absolute TA may be 12 bits. For the manner of determining a TA based on this indicator, reference may be made to the relevant schemes. It can be seen that TA adds up to 13 bits of payload to the CSI report, which can meet the requirements considering the capacity of PUCCH format 3 or 4. An example is as shown in FIG. 9 and FIG. 10, where the R bit may be other payloads or no payload, and Oct represents octet. A/R is an identifier of absolute or relative TA. When A/R is 1, it represents that an absolute TA is being reported, and it is used for a UE to report the absolute TA during initial access. When A/R is 0, it indicates that a relative TA is being reported, and the relative TA is reported to the base station when a UE is in a connected state. The TA command is a timing advance command that includes the TA value, wherein an absolute TA occupies 12 bits and a relative TA occupies 6 bits. TAG ID is TA Group ID, i.e., an identity of a TA group, and different TA groups maintain their respective TAs.

B. If the long format TA (absolute TA) is not considered, the format of TA may support only the relative TA, as shown in FIG. 11, where Oct represents octet.

3. CSI Priority

Considering that the TA reported by the UE needs to be used for deriving UE-specific K_offset, used for uplink and downlink scheduling or for calculating the TA command, when a conflict occurs between resources requested for CSIs of rank indicator (RI), uplink state information reference signal resource indicator (CRI) and channel quality indicator (CQI), uplink timing advance (TA) or beam management information that are simultaneously reported by a UE, a priority order from high to low is beam management>RI>TA>CRI and CQI (which correspond to CSIs other than the beam management and RI). The priority order corresponds to: the transmission priority of the above TA information is lower than the transmission priority of the beam management information and RI, and is higher than the transmission priority of CSI information other than the beam management information and RI.

4. In a scenario where both periodic and/or semi-persistent TA reporting and aperiodic TA reporting are configured, a threshold parameter may be configured through a RRC layer. When a periodic TA is to be reported, if a difference value between a TA value to be reported and an aperiodic TA most recently reported is less than the threshold, UE may not perform periodic TA reporting (this is for the case where the most recent TA reporting is aperiodic TA reporting; otherwise, if the most recent TA reporting is periodic TA reporting, the current periodic TA must be reported. This corresponds to: transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information: transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold: not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold).

During receiving a periodic TA, if no data is detected, the base station considers that TA remains unchanged (which corresponds to: in case that TA information belonging to periodic transmission information is not received at a current transmission moment of the TA information, determining that TA information for the current transmission moment is the same as TA information received at a most recent transmission moment). This can further save air-interface resources. The following is an example of the definition of the threshold:

the threshold for reporting the uplink timing advance threshold TA is: INTEGER (1 . . . 64).

5. Modulation and Coding Schemes

As a UCI, TA may be transmitted in PUCCH format 2, 3 or 4, and modulated using QPSK or π/2-BPSK. In addition, a Reed-Muller code is used for encoding when the payload of a TA (without UCI other than the TA, i.e., excluding other UCIs) is less than or equal to 11 bits (a specific implementation example of the first bit quantity mentioned above), and a polar code is used for encoding when the payload of the TA (without other UCIs) is greater than 11 bits.

An specific example is given below for this solution, as shown in FIG. 12:

It is assumed that a UE reports a TA, a reporting periodicity of the TA is 10 ms, a threshold is 5, and aperiodic TA is reported every 5 milliseconds and when there is PUSCH scheduled. From the figure, it can be seen that when there exists a UL buffer, a TA may be reported through PUSCH: while when there is no UL buffer, a TA may be reported through periodic CSI on a physical uplink control channel (PUCCH). Compared with conventional methods, this method has the advantages such as saving power, saving PUSCH resources (avoiding additionally scheduling a dedicated PUSCH to transmit the TA information), processing at the MAC layer, and minor modification of related protocols.

In view of the above, the solution provided by the embodiments of the present disclosure involves the following.

1. A UCI-based method which ensures that a UE may timely report timing advance (TA) through PUCCH or PUSCH.

2. On the basis of item 1, by configuring CSI report quantity to add a new type of report quantity to support TA reporting through CSI, relevant CSI reporting mechanisms can be reused to maximize the reuse of relevant protocols.

3. On the basis of item 2, the format of the TA reported by the UE through CSI is defined to support TA reporting on PUCCH and PUSCH, and multiplexing on relevant PUCCH and PUSCH resources, thereby avoiding additional scheduling of PUSCH air interface resources.

4. On the basis of item 3, a priority of the new TA reporting in CSI reporting is defined to ensure that the scheduling can be performed according to priorities when a TA reporting resource conflicts with other CSI reporting resources.

5. On the basis of item 4, a threshold for a UE to report a TA is defined. A periodic TA reporting can be cancelled when it is determined by comparison that a difference value between the TA to be transmitted currently and an most recently reported aperiodic TA is less than the threshold, which further saves PUCCH resources.

In summary, compared to the conventional methods, the solution according to the present disclosure has advantages such as saving power (compared to the above method 1 of using PRACH, this solution saves power: in a scenario of no UL Buffer, one TA transmission performed in methods 2 and 3 requires transmitting SR first and then transmitting PUSCH by a UE as scheduled by a base station, and in this scenario, this solution also saves power as compared to the above methods 2 and 3), multiplexing on relevant PUCCH and PUSCH resources, saving PUSCH resources (avoiding additionally and separately scheduling a PUSCH for transmitting TA information), processing at the MAC layer, and minor modification to relevant protocols.

Figure 13:
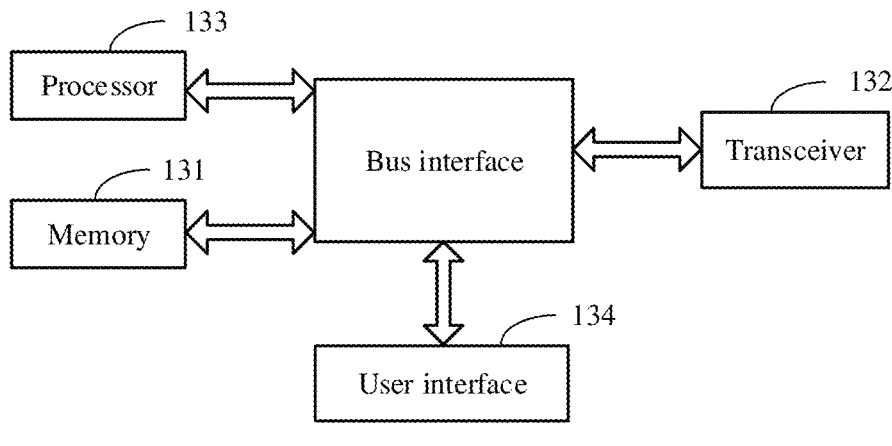
FIG. 13 is a schematic structural diagram of a terminal according to an embodiment of the present disclosure.

An embodiment of the present disclosure further provides a terminal, which, as shown in FIG. 13, includes a memory 131, a transceiver 132 and a processor 133.

The memory 131 is configured to store a computer program; the transceiver 132 is configured to receive and transmit data under the control of the processor 133; the processor 133 is configured to read the computer program in the memory 131 to perform the following operation: transmitting, through the transceiver 132 to a network device, uplink control information (UCI) carrying timing advance (TA) information.

The terminal provided in the embodiments of the present disclosure transmits uplink control information (UCI) carrying timing advance (TA) information to the network device, thus it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

Specifically, the transceiver 132 is configured to receive and send data under the control of the processor 133.

In FIG. 13, a bus architecture may include any quantity of interconnected buses and bridges, and connects various circuits including one or more processors represented by the processor 133 and a memory represented by the memory 131. The bus architecture may also connect various other circuits such as peripherals, voltage regulators and power management circuits, which is well known in the art. Therefore, a detailed description thereof is omitted herein. A bus interface provides an interface. The transceiver 132 may be multiple elements, i.e., a transmitter and a receiver, to allow for communication with various other apparatuses on the transmission media. These transmission media include wireless channel, wired channel, optic fiber or the like. For different user equipment, the user interface 134 may be an interface capable of externally or internally connecting a required device, and the connected device includes, but not limited to, a keypad, a display, a speaker, a microphone, a joystick and the like.

The processor 133 is responsible for supervising the bus architecture and normal operations, and the memory 131 may store the data being used by the processor 133 during operations.

Optionally, the processor 133 may be a central processing unit (CPU), an application specific integrated circuit (ASIC), a field-programmable gate array (FPGA) or a complex programmable logic device (CPLD). The processor may also adopt a multi-core architecture.

The processor is configured to execute any of the methods provided in the embodiments of the present disclosure according to obtained executable instructions by calling a computer program stored in the memory. The processor and the memory may also be physically separated.

The TA information is contained in channel state information (CSI) of the UCI.

In an embodiment of the present disclosure, the transmitting, to the network device, the UCI carrying the TA information includes: transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

In an embodiment of the present disclosure, the TA information includes: TA type information, a TA group identity and a TA index value; and the TA type information is used for indicating that a TA is a relative TA or an absolute TA.

A transmission priority of the TA information is lower than a transmission priority of beam management information and a transmission priority of RI, and is higher than a transmission priority of CSI information other than the beam management information and the RI.

In an embodiment of the present disclosure, the transmitting, to the network device, the UCI carrying the TA information includes: transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or, transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold.

Further, the operation includes: not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

The transmitting, to the network device, the UCI carrying the TA information includes: transmitting, to the network device, the TA information in a first PUCCH format: where the first PUCCH format includes: PUCCH format 2, PUCCH format 3, or PUCCH format 4; the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

It should be noted that the above terminal provided in the embodiment of the present disclosure can implement all method steps implemented in the above method embodiments on the terminal side, and can achieve the same technical effects. Therefore, the description and beneficial effects of this embedment that are the same as the method embodiments will not be described here in detail.

Figure 14:
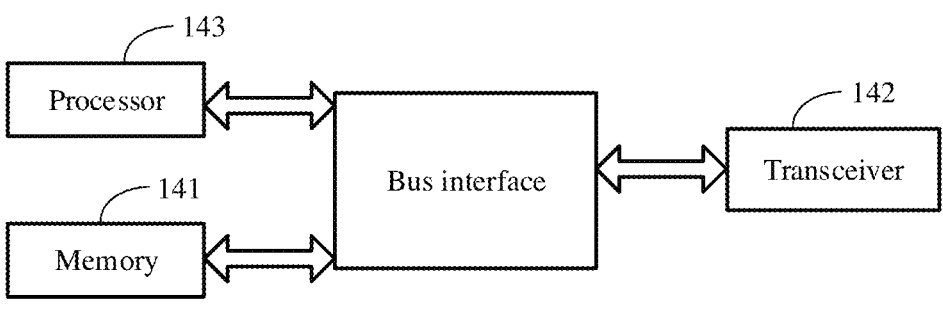
FIG. 14 is a schematic structural diagram of a network device according to an embodiment of the present disclosure.

An embodiment of the present disclosure further provides a network device, which, as shown in FIG. 14, includes a memory 141, a transceiver 142 and a processor 143.

The memory 141 is configured to store a computer program; the transceiver 142 is configured to receive and transmit data under the control of the processor 143; the processor 143 is configured to read the computer program in the memory 141 to perform the following operation: receiving, through the transceiver 142 from the terminal, uplink control information (UCI) carrying timing advance (TA) information.

The network device provided in the embodiments of the present disclosure receives uplink control information (UCI) carrying timing advance (TA) information from a terminal, thus it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

Specifically, the transceiver 142 is configured to receive and send data under the control of the processor 143.

In FIG. 14, a bus architecture may include any quantity of interconnected buses and bridges, and connects various circuits including one or more processors represented by the processor 143 and a memory represented by the memory 141. The bus architecture may also connect various other circuits such as peripherals, voltage regulators and power management circuits, which is well known in the art. Therefore, a detailed description thereof is omitted herein. A bus interface provides an interface. The transceiver 142 may be multiple elements, i.e., a transmitter and a receiver, to allow for communication with various other apparatuses on the transmission media. These transmission media include wireless channel, wired channel, optic fiber or the like. The processor 143 is responsible for supervising the bus architecture and normal operations, and the memory 141 may store the data being used by the processor 143 during operations.

The processor 143 may be a central processing unit (CPU), an application specific integrated circuit (ASIC), a field-programmable gate array (FPGA) or a complex programmable logic device (CPLD). The processor may also adopt a multi-core architecture.

The TA information is contained in channel state information (CSI) of the UCI.

In an embodiment of the present disclosure, the receiving, from the terminal, the UCI carrying the TA information includes: receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

The TA information includes: TA type information, a TA group identity and a TA index value; and the TA type information is used for indicating that a TA is a relative TA or an absolute TA.

In an embodiment of the present disclosure, a transmission priority of the TA information is lower than a transmission priority of the beam management information and a transmission priority of RI, and is higher than a transmission priority of CSI information other than the beam management information and the RI.

The receiving, from the terminal, the UCI carrying the TA information includes: receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or, receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold.

Further, the operation includes: in case that TA information belonging to periodic transmission information is not received at a current transmission moment of the TA information, determining that TA information for the current transmission moment is the same as TA information received at a most recent transmission moment.

The receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or $\pi/2$-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

It should be noted that the above network device provided in the embodiment of the present disclosure can implement all method steps implemented in the above method embodiments on the network device side, and can achieve the same technical effects. Therefore, the description and beneficial effects of this embedment that are the same as the method embodiments will not be described here in detail.

Figure 15:
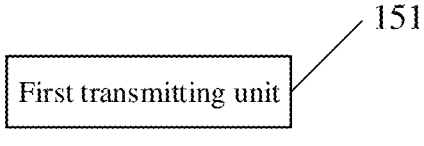
FIG. 15 is a schematic structural diagram of an information transmission apparatus according to an embodiment of the present disclosure.

An embodiment of the present disclosure further provides an information transmission apparatus for a terminal. As shown in FIG. 15, the apparatus includes: a first transmitting unit 151 configured to transmit, to a network device, uplink control information (UCI) carrying timing advance (TA) information.

The information transmission apparatus provided in the embodiments of the present disclosure transmits uplink control information (UCI) carrying timing advance (TA) information to the network device, thus it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

The TA information is contained in channel state information (CSI) of the UCI.

In an embodiment of the present disclosure, the transmitting, to the network device, the UCI carrying the TA information includes: transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

The TA information includes: TA type information, a TA group identity and a TA index value; and the TA type information is used for indicating that a TA is a relative TA or an absolute TA.

In an embodiment of the present disclosure, a transmission priority of the TA information is lower than a transmission priority of beam management information and a transmission priority of RI, and is higher than a transmission priority of CSI information other than the beam management information and the RI.

The transmitting, to the network device, the UCI carrying the TA information includes: transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or, transmitting, to the network device, UCI carrying first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold.

Further, the information transmission apparatus includes: a first processing unit configured to not transmit, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

The transmitting, to the network device, the UCI carrying the TA information includes: transmitting, to the network device, the TA information in a first PUCCH format: where the first PUCCH format includes: PUCCH format 2, PUCCH format 3, or PUCCH format 4; the TA information is modulated using quadrature phase shift keying (QPSK) or $\pi/2$-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

It should be noted that the above apparatus provided in the embodiment of the present disclosure can implement all method steps implemented in the above method embodiments on the terminal side, and can achieve the same technical effects. Therefore, the description and beneficial effects of this embedment that are the same as the method embodiments will not be described here in detail.

Figure 16:
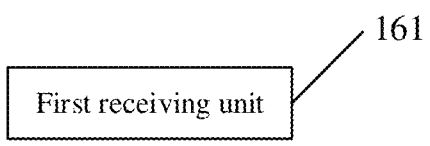
FIG. 16 is another schematic structural diagram of an information transmission apparatus according to an embodiment of the present disclosure.

An embodiment of the present disclosure further provides an information transmission apparatus for a network device. As shown in FIG. 16, the apparatus includes: a first receiving unit 161 configured to receive, from a terminal, uplink control information (UCI) carrying timing advance (TA) information.

The information transmission apparatus provided in the embodiments of the present disclosure receives, from a terminal, uplink control information (UCI) carrying timing advance (TA) information, thus it is able to achieve direct transmission of TA information without operations such as frequent triggering of RA access or sending SR in advance, which simplifies the transmission operation and reduces the power consumption, thereby effectively solving the problem of the high power consumption in conventional TA information transmission solutions.

The TA information is contained in channel state information (CSI) of the UCI.

In an embodiment of the present disclosure, the receiving, from the terminal, the UCI carrying the TA information includes: receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

The TA information includes: TA type information, a TA group identity and a TA index value; and the TA type information is used for indicating that a TA is a relative TA or an absolute TA.

In an embodiment of the present disclosure, a transmission priority of the TA information is lower than a transmission priority of the beam management information and a transmission priority of RI, and is higher than a transmission priority of CSI information other than the beam management information and the RI.

The receiving, from the terminal, the UCI carrying the TA information includes: receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or, receiving UCI carrying first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold.

Further, the information transmission apparatus includes: a first determining unit configured to, in case that TA information belonging to periodic transmission information is not received at a current transmission moment of the TA information, determine that TA information for the current transmission moment is the same as TA information received at a most recent transmission moment.

The receiving, from the terminal, the UCI carrying the TA information includes: receiving the TA information transmitted by the terminal in a first PUCCH format, where the first PUCCH format includes: PUCCH format 2, PUCCH format 3, or PUCCH format 4; the TA information is modulated using quadrature phase shift keying (QPSK) or $\pi/2$-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

It should be noted that the above apparatus provided in the embodiment of the present disclosure can implement all method steps implemented in the above method embodiments at the network device side, and can achieve the same technical effects. Therefore, the part and beneficial effects of this embedment that are the same as the method embodiments will not be described here in detail.

It should be noted that the division of units in the embodiments of the present disclosure is illustrative, and is only a logical function division, and there may be another division manner in actual implementation. In addition, the functional units in various embodiments of the present disclosure may be integrated into one processing unit, or each unit may exist separately physically, or two or more units may be integrated into one unit. The above-mentioned integrated units may be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute part or all of the steps of the methods described in the various embodiments of the present disclosure. The aforementioned storage media include: universal serial bus (USB) flash drive, removable hard disk, read-only memory (ROM), random access memory (RAM), magnetic disk, optical disc or other media that can store program codes.

An embodiment of the present disclosure further provides a processor readable storage medium, where the processor readable storage medium stores a computer program. The computer program is used for causing the processor to execute the above information transmission method on the terminal side. Alternatively, the computer program is used for causing the processor to execute the above information transmission method on the network device side.

The processor readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, erasable programmable ROM (EPROM), electrically erasable programmable ROM (EEPROM), non-volatile memory (NAND FLASH), solid-state drive (SSD)), etc.

All of the embodiments of the information transmission method implemented on the terminal side or the network device side mentioned above are applicable to the embodiments of the processor readable storage medium, and can also achieve the same technical effect.

Those skilled in the art should appreciate that the embodiments of the present disclosure may be provided as a method, a system, or a computer program product. Therefore, the present disclosure may take the form of complete hardware embodiments, complete software embodiments, or embodiments combining software and hardware. Moreover, the present disclosure may take the form of a computer program product implemented on one or more computer usable storage media (including but not limited to magnetic disk storage, optical storage, etc.) including a computer usable program code.

The present disclosure is described with reference to the flow chart and/or the block diagram of the method, device (system), and computer program product according to the embodiments of the present disclosure. It should be appreciated that each of processes and/or blocks in a flow chart and/or block diagram, and a combination of the processes and/or blocks in the flow chart and/or block diagram may be implemented by computer executable instructions. These computer executable instructions may be provided to a processor of a general-purpose computer, a specialized computer, an embedded processing device, or other programmable data processing devices to generate a machine, such that the instructions, which are executed via the processor of the computer or other programmable data processing terminal device, create means for implementing the functions specified in the flow diagram flow or flows and/or block diagram block or blocks.

These processor executable instructions may also be stored in processor-readable memory that may guide computers or other programmable data processing devices to work in a specific way, causing the instructions stored in the processor readable memory to generate a manufacturing product including instruction devices that implement the functions specified in the flow diagram flow or flows and/or block diagram block or blocks.

These processor executable instructions may also be loaded onto a computer or other programmable data processing device, enabling a series of operational steps to be performed on the computer or other programmable device to generate computer-implemented processing, such that the instructions which are executed on the computer or other programmable terminal device provide steps for implementing the functions specified in the flow diagram flow or flows and/or block diagram block or blocks.

It should be noted and understood that the division of the above modules is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above device in the form of program code which is called and executed by a certain processing element of the above device to perform the functions of the determination module. Other modules have similar implementations. In addition, all or part of these modules may be integrated together, and may be implemented independently. The processing element mentioned here may be an integrated circuit with signal processing capability. In the implementation process, the various steps of the above method or the above various modules may be implemented by an integrated logic circuit in hardware form in elements of a processor or instructions in the form of software.

For example, the various modules, units, subunits or submodules may be one or more integrated circuits configured to implement the above methods, such as one or more application specific integrated circuits (ASIC), or one or more microprocessors (digital signal processor, DSP), or one or more field programmable gate arrays (FPGA). As another example, when a module described above is implemented in the form of program codes called by a processing element, the processing element may be a general purpose processor, such as a central processing unit (CPU) or other processors that may call program codes. As another example, these modules may be integrated together and implemented as a system-on-a-chip (SOC).

Terms such as "first" and "second" in the specification and the claims of the present disclosure are used for distinguishing similar objects and are not necessarily used for describing a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent in the process, method, product, or device. Moreover, the term "and/or" used in the specification and the claims indicates at least one of connected objects, for example, A and/or B and/or C means 7 situations including: A alone, B alone, C alone, both A and B, both B and C, both A and C, and all of A, B and C. Similarly, the use of "at least one of A and B" in this specification and claims should be understood as "A alone, B alone, or both A and B".

Apparently, a person of ordinary skills in the art can make various modifications and variations to the present disclosure without departing from the spirit and scope of the present disclosure. In this way, if these modifications and variations of the present disclosure fall within the scope of the claims and their equivalent technologies, the present disclosure also intends to include these modifications and variations.

What is claimed is:

1. An information transmission method, performed by a terminal, comprising:
determining timing advance (TA) information including TA type information, a TA group identity and a TA index value;
determining a transmission priority of the TA information such that the transmission priority of the TA information is lower than a transmission priority of beam management information and a transmission priority of a rank indicator (RI), and higher than a transmission priority of channel state information (CSI) information other than the beam management information and the RI; and
transmitting, to a network device, uplink control information (UCI) carrying the TA information based on the transmission priority, wherein the TA type information is used for indicating that a TA is a relative TA or an absolute TA; wherein the transmitting, to the network device, the UCI carrying the TA information comprises:
transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or,
transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold; and
wherein the network device is configured to determine that TA information for a current transmission moment is same as TA information received at a most recent transmission moment, in case that TA information belonging to periodic transmission information is not received at the current transmission moment of the TA information.

2. The information transmission method according to claim 1, wherein the TA information is contained in channel state information (CSI) of the UCI.

3. The information transmission method according to claim 2, wherein the transmitting, to the network device, the UCI carrying the TA information comprises:

transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

4. The information transmission method according to claim 1, further comprising:

not transmitting, to the network device, the UCI carrying the first TA information that is to-be-transmitted TA information in case that the first TA information belongs to periodic transmission information or semi-persistent transmission information, the second TA information that is the most recently transmitted TA information belongs to aperiodic transmission information and the difference value between the first TA information and the second TA information is less than the threshold.

5. The information transmission method according to claim 1, wherein the transmitting, to the network device, the UCI carrying the TA information comprises:

transmitting, to the network device, the TA information in a first PUCCH format;

wherein the first PUCCH format comprises: PUCCH format 2, PUCCH format 3, or PUCCH format 4;

the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

6. An information transmission method, performed by a network device, comprising:

receiving, from a terminal, uplink control information (UCI) carrying timing advance (TA) information, wherein a transmission priority of the TA information is lower than a transmission priority of beam management information and a transmission priority of a rank indicator (RI), and higher than a transmission priority of channel state information (CSI) information other than the beam management information and the RI, and wherein the receiving, from the terminal, the UCI carrying the TA information comprises:

receiving UCI carrying first TA information, wherein the UCI carrying the first TA information is transmitted by the terminal in case that the first TA information that is to-be-transmitted TA information belongs to periodic transmission information or semi-persistent transmission information, and second TA information that is the most recently transmitted TA information belongs to periodic transmission information or semi-persistent transmission information; or, receiving the UCI carrying the first TA information, wherein the UCI carrying the first TA information is transmitted by the terminal in case that the first TA information that is to-be-transmitted TA information belongs to periodic transmission information or semi-persistent transmission information, the second TA information that is the most recently transmitted TA information belongs to aperiodic transmission information, and a difference value between the first TA information and the second TA information is greater than or equal to a threshold; and determining, from the TA information received from the terminal, TA type information, a TA group identity and a TA index value, wherein the TA type information is used for indicating that a TA is a relative TA or an absolute TA; and determining that TA information for a current transmission moment is same as TA information received at a most recent transmission moment, in case that TA information belonging to periodic transmission information is not received at the current transmission moment of the TA information.

7. The information transmission method according to claim 6, wherein the TA information is contained in channel state information (CSI) of the UCI.

8. The information transmission method according to claim 7, wherein the receiving, from the terminal, the UCI carrying the TA information comprises:

receiving periodic CSI or semi-persistent CSI carrying the TA information that is transmitted by the terminal by using a physical uplink control channel (PUCCH); or, receiving aperiodic CSI carrying the TA information that is transmitted by the terminal by using a physical uplink shared channel (PUSCH).

9. The information transmission method according to claim 6, wherein the receiving, from the terminal, the UCI carrying the TA information comprises:

receiving the TA information transmitted by the terminal in a first PUCCH format, wherein the first PUCCH format comprises: PUCCH format 2, PUCCH format 3, or PUCCH format 4;

the TA information is modulated using quadrature phase shift keying (QPSK) or π/2-binary phase shift keying (BPSK); and/or, the TA information is encoded using a Reed-Muller code in case that a payload of the TA information is less than or equal to a first bit quantity; the TA information is encoded using a polar code in case that the payload of the TA information is greater than the first bit quantity.

10. A terminal, comprising a memory, a transceiver and a processor, wherein, the memory is configured to store a computer program; the transceiver is configured to transmit and receive data under control of the processor; and the processor is configured to read the computer program in the memory to perform the following operations:

determining timing advance (TA) information including TA type information, a TA group identity and a TA index value;

determining a transmission priority of the TA information such that the transmission priority of the TA information is lower than a transmission priority of beam management information and a transmission priority of a rank indicator (RI), and higher than a transmission priority of channel state information (CSI) information other than the beam management information and the RI; and transmitting, by the transceiver to a network device, uplink control information (UCI) carrying the TA information based on the transmission priority, wherein the TA type information is used for indicating that a TA is a relative TA or an absolute TA, and wherein the transmitting, to the network device, the UCI carrying the TA information comprises:

transmitting, to the network device, UCI carrying first TA information that is to-be-transmitted TA information in case that the first TA information belongs to periodic transmission information or semi-persistent transmission information, and second TA information that is the most recently transmitted TA information belongs to periodic transmission information or semi-persistent transmission information; or, transmitting, to the network device, UCI carrying the first TA information that is to-be-transmitted TA information in case that the first TA information belongs to periodic transmission information or semi-persistent transmission information, the second TA information that is the most recently transmitted TA information belongs to aperiodic transmission information and a difference value between the first TA information and the second TA information is greater than or equal to a threshold; and wherein the network device is configured to determine that TA information for a current transmission moment is same as TA information received at a most recent transmission moment, in case that TA information belonging to periodic transmission information is not received at the current transmission moment of the TA information.

11. The terminal according to claim 10, wherein the TA information is contained in channel state information (CSI) of the UCI.

12. The terminal according to claim 11, wherein the transmitting, to the network device, the UCI carrying the TA information comprises:

transmitting, to the network device by using a physical uplink control channel (PUCCH), periodic CSI or semi-persistent CSI carrying the TA information; or, transmitting, to the network device by using a physical uplink shared channel (PUSCH), aperiodic CSI carrying the TA information.

13. A network device, comprising a memory, a transceiver and a processor, wherein, the memory is configured to store a computer program; the transceiver is configured to transmit and receive data under control of the processor; and the processor is configured to read the computer program in the memory to perform the information transmission method according to claim 6.

\* \* \* \* \*